(12) United States Patent
Morita

(10) Patent No.: US 10,348,953 B2
(45) Date of Patent: Jul. 9, 2019

(54) COMMUNICATION DEVICE AND METHOD OF CONTROLLING SAME

(71) Applicant: CANON KABUSHIKI KAISHA, Tokyo (JP)

(72) Inventor: Hiroyasu Morita, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 55 days.

(21) Appl. No.: 15/668,833

(22) Filed: Aug. 4, 2017

(65) Prior Publication Data

US 2018/0048803 A1 Feb. 15, 2018

(30) Foreign Application Priority Data

Aug. 10, 2016 (JP) ................................. 2016-158127

(51) Int. Cl.
| | |
|---|---|
| *H04W 4/80* | (2018.01) |
| *H04L 29/06* | (2006.01) |
| *H04N 5/232* | (2006.01) |
| *H04W 76/14* | (2018.01) |
| *H04W 76/30* | (2018.01) |

(52) U.S. Cl.
CPC ......... *H04N 5/23206* (2013.01); *H04L 69/14* (2013.01); *H04N 5/232* (2013.01); *H04W 4/80* (2018.02); *H04W 76/14* (2018.02); *H04W 76/30* (2018.02)

(58) Field of Classification Search
CPC ..... H04N 5/232; H04N 5/23206; H04W 4/80; H04W 76/14; H04W 76/30
See application file for complete search history.

(56) References Cited

U.S. PATENT DOCUMENTS 9,253,714 B2 * 2/2016 Lou ........................ H04W 48/16
2005/0239500 A1 * 10/2005 Liu ........................ H04W 88/02
455/553.1

FOREIGN PATENT DOCUMENTS

JP 2003-233578 A 8/2003

* cited by examiner

*Primary Examiner* — Kashif Siddiqui
(74) *Attorney, Agent, or Firm* — Venable LLP

(57) ABSTRACT

A communication device has a first communication interface, a second communication interface, and a third communication interface. The communication device gives priority to communication by the third communication interface in a first period that does not include a period for a process for switching communication by the first communication interface to communication by the second communication interface, even if communication by the first communication interface is underway. The communication device also gives priority to communication by the first communication interface over communication by the third communication interface in a second period that includes the period for the process for switching.

12 Claims, 5 Drawing Sheets

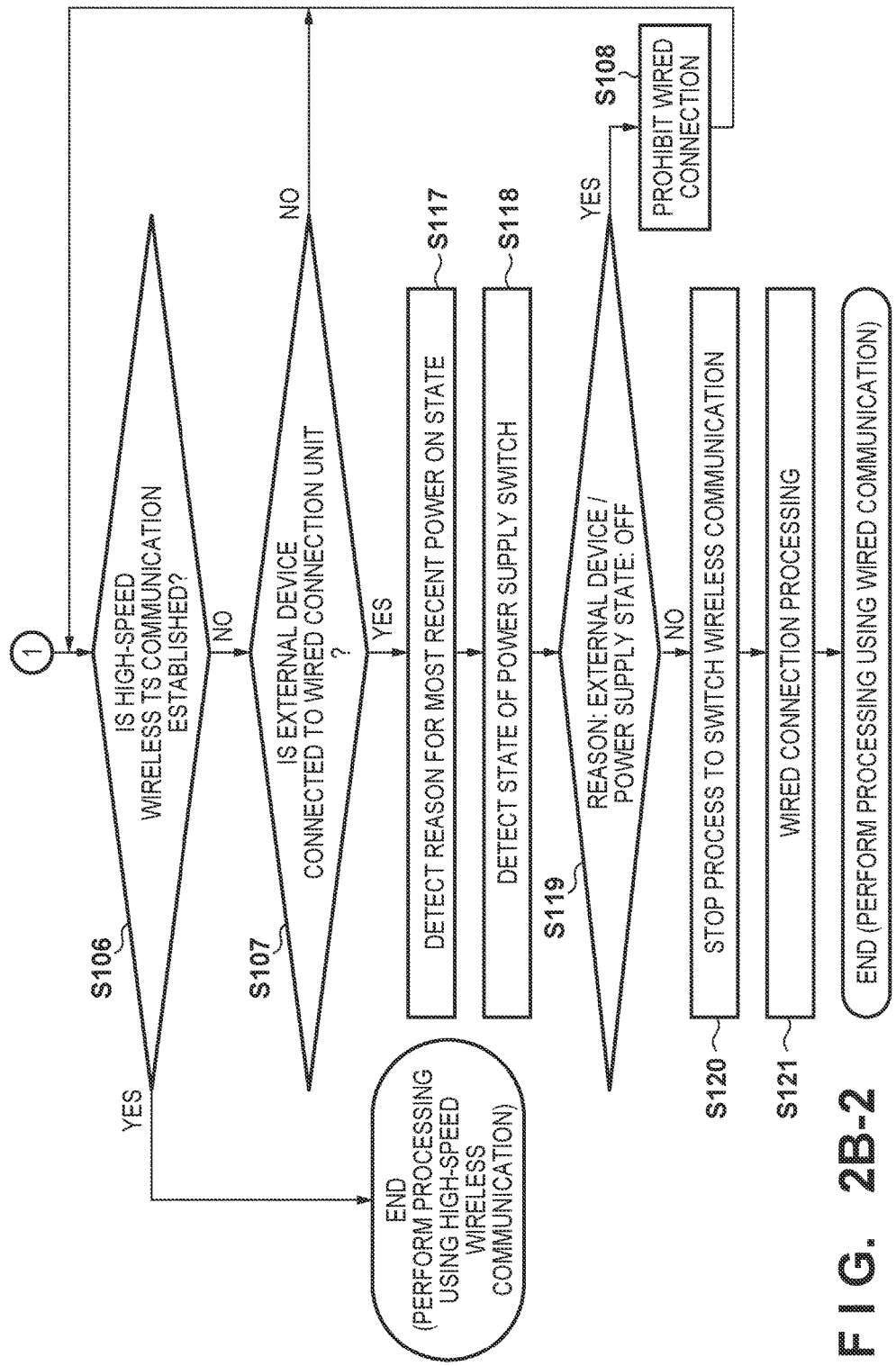

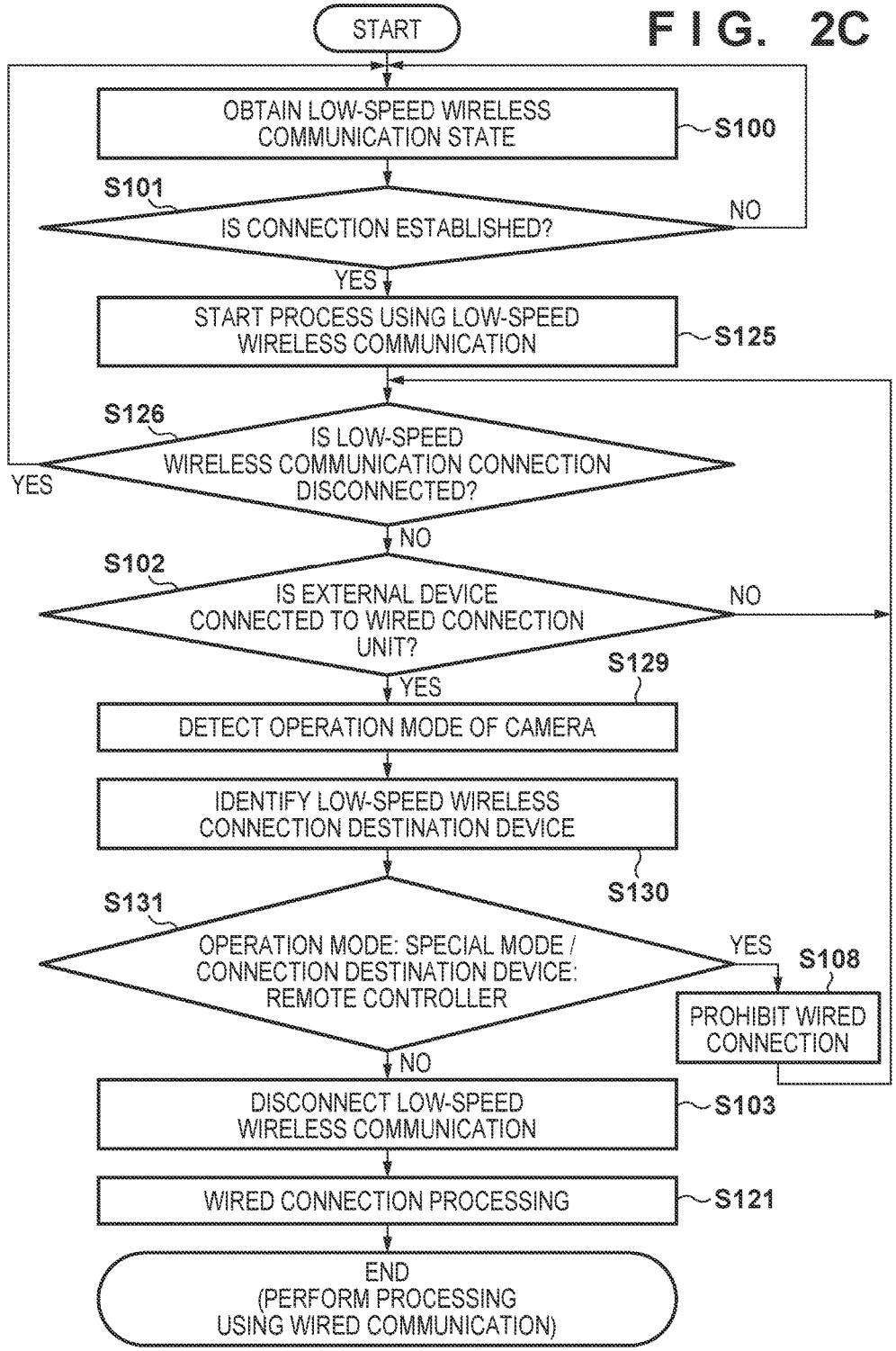

COMMUNICATION DEVICE AND METHOD OF CONTROLLING SAME

BACKGROUND OF THE INVENTION

Field of the Invention

The present invention relates to a communication device and a method of controlling the same, and in particular relates to a communication device that can communicate with an external device by a plurality of methods and a method of controlling the same.

Description of the Related Art

Electronic devices (communication devices), such as digital cameras, having a communication function for connecting with an external device are widely used. In addition, there are also communication devices that support a plurality of communication methods (standards). In a communication device that supports a plurality of communication methods, to prevent competition in access to supplied resources such as a memory card, exclusive control is often performed such that communication using a plurality of communication methods is not performed simultaneously (Japanese Patent Laid-Open No. 2003-233578). In addition, such exclusive control may be performed for the purpose of avoiding interference such as for radio waves used in communication.

However, in exclusive control that enables a communication interface that first receives a predetermined command and disables other communication interfaces, as recited in Japanese Patent Laid-Open No. 2003-233578, it is not possible to communicate by automatically switching between a plurality of communication methods. In addition, for example in a case where a communication device performs automatic communication with an external device in an idle time or the like, there is the possibility that usability for a user will be degraded because other communication cannot be performed during the automatic communication.

SUMMARY OF THE INVENTION

The present invention provides a communication device that can control whether or not usage of a communication method is allowed in consideration of usability for a user, and a method of controlling the same.

According to an aspect of the present invention, there is provided a communication device, comprising: a first communication unit; a second communication unit; a third communication unit; a switching unit configured to switch communication by the first communication unit to communication by the second communication unit; and a control unit, wherein the control unit in a first period that does not include a period of a process for switching by the switching unit, gives priority to communication by the third communication unit even if communication by the first communication unit is underway, and in a second period that includes the period of the process for switching by the switching unit, gives priority to communication by the first communication unit over communication by the third communication unit.

According to another aspect of the present invention, there is provided a method of controlling a communication device having a first communication unit, a second communication unit, a third communication unit, and a switching unit that switches communication by the first communication unit to communication by the second communication unit, the method comprising: in a first period that does not include a period of a process for switching by the switching unit, giving priority to communication by the third communication unit even if communication by the first communication unit is underway, and in a second period that includes the period of the process for switching by the switching unit, giving priority to communication by the first communication unit over communication by the third communication unit.

According to an aspect of the present invention, there is provided a non-transitory computer-readable storage medium storing a program having instructions that can be executed by one or more processors provided by a communication device having a first communication unit, a second communication unit, a third communication unit, and a switching unit for switching communication by the first communication unit to communication by the second communication unit, the instructions, when executed by the one or more processors, cause the one or more processors to function as a control unit configured to in a first period that does not include a period of a process for switching by the switching unit, give priority to communication by the third communication unit even if communication by the first communication unit is underway, and in a second period that includes the period of the process for switching by the switching unit, give priority to communication by the first communication unit over communication by the third communication unit.

Further features of the present invention will become apparent from the following description of exemplary embodiments with reference to the attached drawings.

BRIEF DESCRIPTION OF THE DRAWINGS

FIGS. 2B-1 and 2B-2 are flowcharts for explaining communication control of the digital camera according to a second embodiment.

FIG. 2C is a flowchart for explaining communication control of the digital camera according to a third embodiment.

DESCRIPTION OF THE EMBODIMENTS

Exemplary embodiments of the present invention will now be described in detail in accordance with the accompanying drawings. Note that, in the following embodiments, explanation is given regarding a digital camera as an example of a communication device according to the present invention. However, a capturing function is not necessary in the present invention, and the present invention can be applied to any communication device that supports three or more types of communication methods. Such a communication device includes a digital camera, a personal computer, a tablet computer, a mobile telephone, a smart phone, a PDA, a game device, or the like, but is not limited to these.

Figure 1:
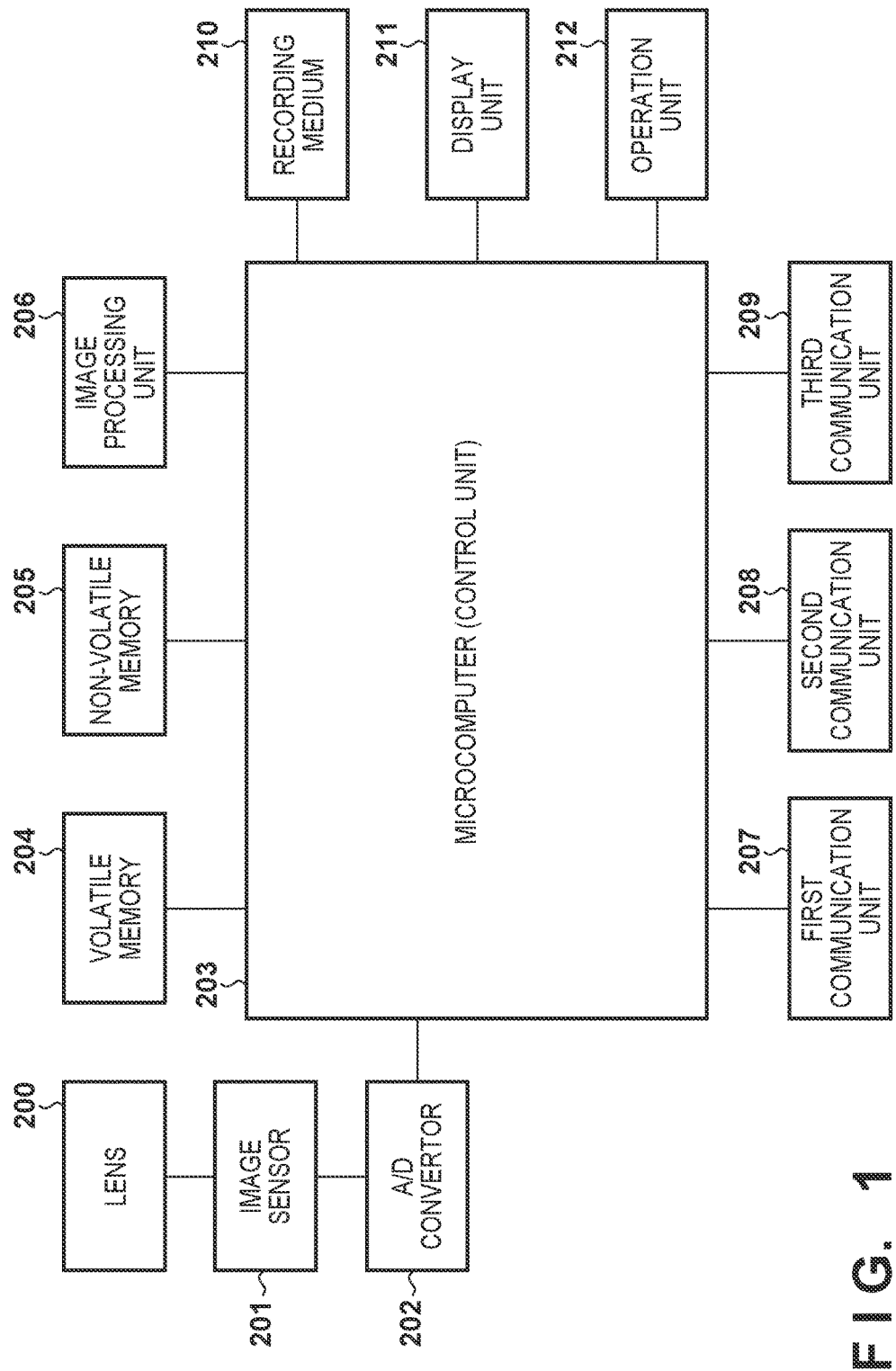
FIG. 1 is a block diagram illustrating an example of a configuration of a digital camera as a communication device according to the present invention.

A shooting lens 200 in FIG. 1 forms a subject image on an image capturing plane of an image sensor 201. The image sensor 201 has a plurality of pixels, converts a subject image formed by the shooting lens 200 into an electrical signal at each pixel, and outputs them as an analog image signal. An A/D converter 202 converts an analog image signal outputted by the image sensor 201 into a digital image signal (image data), and then outputs the digital image signal to a microcomputer 203.

The microcomputer (hereinafter referred to as a control unit) 203 stores digital image data received from the A/D converter 202 in a volatile memory 204. The control unit 203 realizes each function of the digital camera, including communication control explained below, by reading a program stored in a non-volatile memory 205 into the volatile memory 204 and executing it, for example.

The volatile memory 204 is a so-called RAM, is used for the control unit 203 to execute a program, and is used for example for temporarily saving image data read from a recording medium 210 or image data obtained by capturing. In addition, a region of the volatile memory 204 may be used as a VRAM for storing images for display for a display unit 211.

The non-volatile memory 205 stores a program that the control unit 203 executes, GUI data displayed on the display unit 211, various setting values, and the like. The setting values include information of an external device, parameters for communicating by first to third communication units 207 to 209, or the like.

An image processing unit 206 applies predetermined image processing, such as a shading correction, white balance adjustment, color interpolation, and encoding, with respect to image data obtained by capturing. In addition, the image processing unit 206 may execute image processing such as generating evaluation values for AF and AE processing and subject detection, with respect to image data. In addition, the image processing unit 206 may generate images to be displayed by the display unit 211, decoding of image data read from the recording medium 210, or the like.

For example, the recording medium 210 which is a semiconductor memory card is used to store image data obtained by capturing. Reading and writing of data with respect to the recording medium 210 is controlled by the control unit 203.

The display unit 211 is a touch display for example, and is used to display a menu screen of the digital camera, or image data read from the recording medium 210 or obtained by capturing. In addition, the display unit 211 may be used as an EVF for the digital camera.

An operation unit 212 includes an input device such as keys or buttons. The operation unit 212 may include a power supply switch, a shutter button, a directional key, an OK (SET) key, a menu key, a playing/imaging mode changing switch, a movie capture button, or the like, but there is no limitation to these. Note that the touch panel of the display unit 211 may be included in the operation unit 212. An operation with respect to the operation unit 212 is detected by the control unit 203, and the control unit 203 executes a function in accordance with the detected operation.

The first communication unit 207, the second communication unit 208, and the third communication unit 209 are communication interfaces for executing communication that complies with respectively different communication methods (communication standards), with an external device. A communication unit that performs wired communication is provided with a connector in accordance with a standard, and a communication unit that performs wireless communication is provided with an antenna in accordance with a standard. In addition, each of the first to third communication units 207 to 209 is provided with a frequency conversion circuit, a level conversion circuit, a modulation/demodulation circuit, a transmission/reception circuit, and the like that are in accordance with the standard that they respectively comply with. Note that all of the first to third communication units 207 to 209 may have the form of a communication module that can be attached/detached.

The present embodiment, it is assumed that wireless communication that complies with at least two different wireless communication standards, and wired communication that complies with at least one wired communication standard can be executed. It is also assumed that the first communication unit 207 and the second communication unit 208 execute wireless communication, and the third communication unit 209 executes wired communication. In addition, it is assumed that the first communication unit 207 and the second communication unit 208 perform wireless communication that is different with respect to at least one of a maximum communication distance, a maximum communication speed, and maximum power consumption (in the standards). Here, it is assumed that the first communication unit 207 performs wireless communication for which at least a maximum communication speed under the standard is less than that of the second communication unit 208. In addition, for convenience, wireless communication by the first communication unit 207 is referred to as "low-speed wireless communication", and wireless communication by the second communication unit 208 is referred to as "high-speed wireless communication". As a representative combination that satisfies this condition, a combination of NFC (Near Field Communication) and Bluetooth (registered trademark) or Wi-Fi, and a combination of BLE (Bluetooth Low Energy) and Wi-Fi can be given as examples. Note that these are merely examples, and combinations of other communication standards are possible. In addition, while there is no particular restriction for a standard for wired communication that the third communication unit 209 complies with, it is possible to give USB as a representative example.

Note that there is no particular restriction on an external device that a digital camera communicates with, and the external device may be any communication device capable of communication that complies with communication standards that the respective communication units support. A personal computer (including a tablet terminal) or a smart phone are stereotypical examples, but there is no limitation to these.

In the present embodiment, because it is possible to provide similar functions such as image browsing, for example, to the external device by the high-speed wireless communication by the second communication unit 208 and the wired communication by the third communication unit 209, it is assumed that exclusive control is performed to prohibit simultaneous connections by the high-speed wireless communication by the second communication unit 208 and the wired communication by the third communication unit 209. In addition, it is assumed that exclusive control is performed for low-speed wireless communication by the first communication unit 207 and wired communication by the third communication unit 209, in order to prevent resource competition such as for a memory or a processor, an electrical capacitance upper limit being reached, and electrical interference, for example. However, it is assumed that wired communication is given priority over low-speed wireless communication in principle.

Figure 2A:
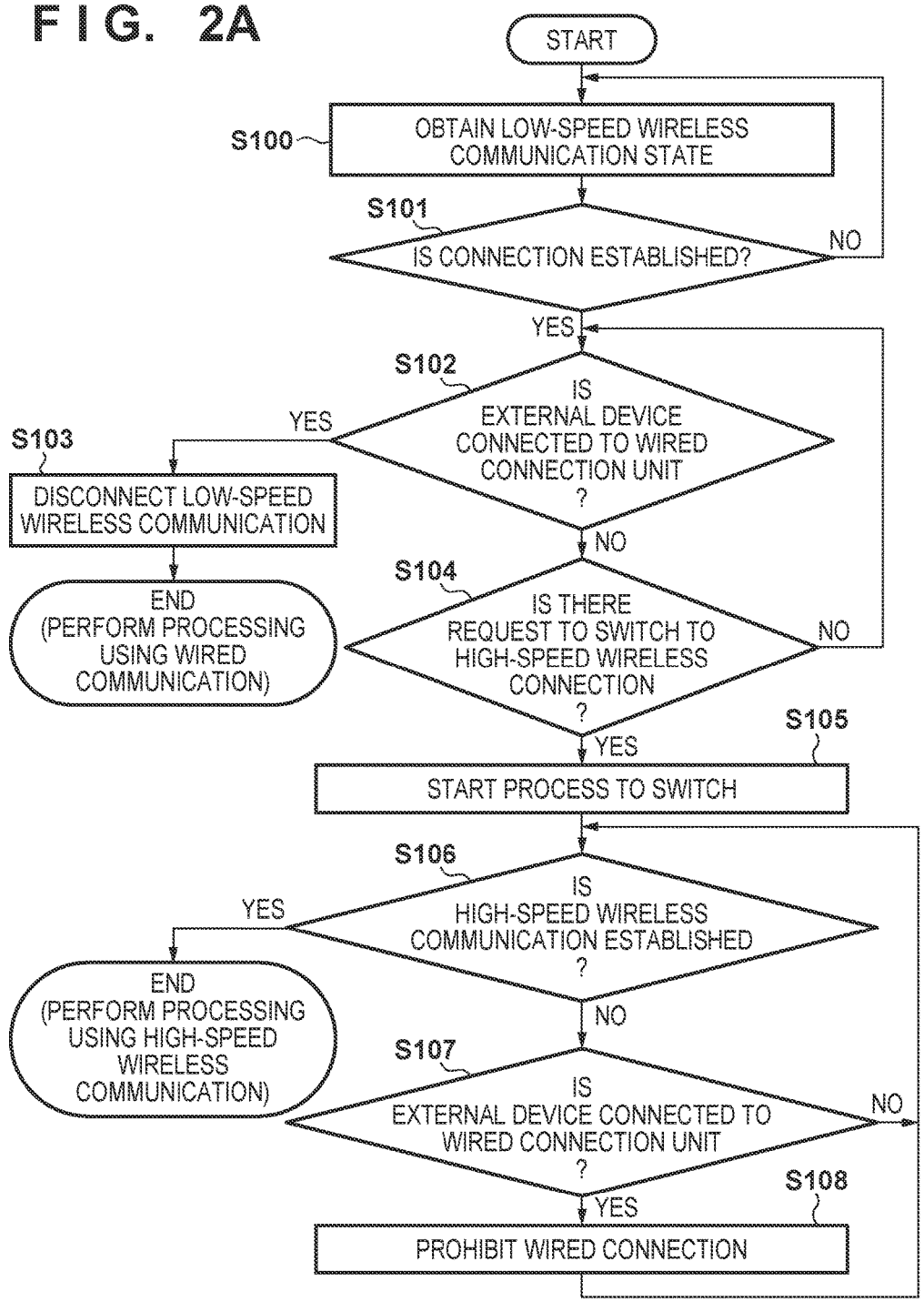
FIG. 2A is a flowchart for explaining communication control of the digital camera according to a first embodiment.

FIG. 2A is a flowchart for explaining an example of communication permission/prohibition control in the present embodiment.

Here, explanation is given regarding a case in which, after communication by the first communication unit 207 is first established with the external device, communication with the external device is switched to communication by the second communication unit 208.

In step S100, the control unit 203 detects a state of communication by the first communication unit 207 with the external device (a first external device), for example by querying the first communication unit 207. Note that information necessary for communication by the first communication unit 207 with the external device is stored in the non-volatile memory 205, for example. At least some of this information may be displayed on a menu screen for setting on the display unit 211 to allow it to be set by a user through the operation unit 212. For example, the first communication unit 207 may be configured such that, when an external device with which communication is possible approaches to within a distance at which communication is possible, the first communication unit 207 executes predetermined processing to establish a low-speed wireless communication connection with the external device.

In step S101, the control unit 203 determines whether the first communication unit 207 has established a low-speed wireless communication connection with the external device based on a result of the detection in step S100 (determines whether a connected state has been entered), and if the connected state is determined, the processing advances to step S102, and if not determined the processing returns to step S100. In this way, the control unit 203 repeatedly executes the processing of step S100 and step S101 until it detects that the first communication unit 207 has established a low-speed wireless communication connection.

In step S102, the control unit 203 determines whether a connection by an external device (a second external device) with respect to the third communication unit 209 (a physical connection) has been detected, and if it is determined that a connection has been detected the processing advances to step S103, and if it is not determined that a connection has been detected the processing advances to step S104. For example, in a case where the third communication unit 209 performs a USB communication, it is possible to determine whether an external device (host) has connected by examining a potential of a pin of a USB connector that the third communication unit 209 has. For other standards it is generally also possible to detect a connection of an external device in accordance with a potential of specific pin of a connector.

In step S103, the control unit 203 disconnects the low-speed wireless communication connection by the first communication unit 207, and allows the wired communication by the third communication unit 209. Subsequently, processing for establishing communication (a logical connection) between the third communication unit 209 and the external device is executed, and processing that uses wired communication is executed. As processing that uses wired communication, for example processing for realizing a function for browsing images stored in the recording medium 210 on a display device of an external device may be considered, but there is no limitation to this.

In step S104, the control unit 203 determines an existence or absence of a request to switch to high-speed wireless communication in regard to communication with the external device. A request to switch, for example, may be an explicit request from a user in accordance with operation of a menu screen through the operation unit 212, or may be received from the external device through the first communication unit 207. If the control unit 203 determines that there is a request to switch, the processing advances to step S105, and if this is not determined the processing returns to step S102.

In step S105, the control unit 203 starts a process for switching from low-speed wireless communication to high-speed wireless communication. For example, the control unit 203 performs control so that information necessary for execution of high-speed wireless communication by the second communication unit 208 is exchanged with the external device through the low-speed wireless communication by the first communication unit 207, and a switch request is transmitted from the first communication unit 207 to the external device. Note that such switching of wireless communication is known as a (vertical) handover technique, and in the present embodiment explanation regarding detail of a process for switching is omitted because it is possible to use a publicly known technique therefor.

In step S106, the control unit 203 determines whether the process for switching to high-speed wireless communication that started in step S105 is complete, and if it is determined to be complete the processing terminates, and if it is not determined to be complete the processing advances to step S107. Note that completion of the process for switching can be determined in accordance with whether it is possible to confirm the establishment of a connection (a connected state) after obtaining a state of wireless communication in the second communication unit 208, for example.

For example, if the external device is a smart phone, the scenario explained here corresponds to a case where low-speed wireless communication is first established, information necessary for high-speed wireless communication is exchanged, and then the smart phone is provided with a function involving image communication that has a high amount of data by the high-speed wireless communication. For the function that involves image communication, for example a function for browsing images stored in the recording medium 210 on a display device of the external device may be considered, but there is no limitation to this.

In step S107, similarly to in step S102, the control unit 203 determines whether a connection by an external device with respect to the third communication unit 209 has been detected, and if it is determined that a connection is detected the processing advances to step S108, and if it is not determined that a connection is detected, the processing returns to step S106.

In step S108, the control unit 203 prohibits communication by the third communication unit 209. Specifically, the control unit 203 controls the third communication unit 209 so as to not respond normally (or not respond at all) with respect to a connection establishment request from an external device. Alternatively, the control unit 203 may disable operation of the third communication unit 209.

In this way, in the present embodiment, if a connection by an external device to a wired communication unit is detected when a low-speed wireless communication connection to an external device has been established, wired communication is given priority and low-speed wireless communication is disconnected unless a process for switching to high-speed wireless communication is underway. Meanwhile, in a case where a process for switching to high-speed wireless communication is underway, it is possible to prevent the switch to high-speed wireless communication from being interrupted by prohibiting wired communication. Therefore, it is possible to prevent a user who attempts image browsing from the external device, for example, from ceasing to be able to perform image browsing due to another external device being connected to a wired communication unit during the process for switching.

(Second Embodiment)

Figures 1, 2B:
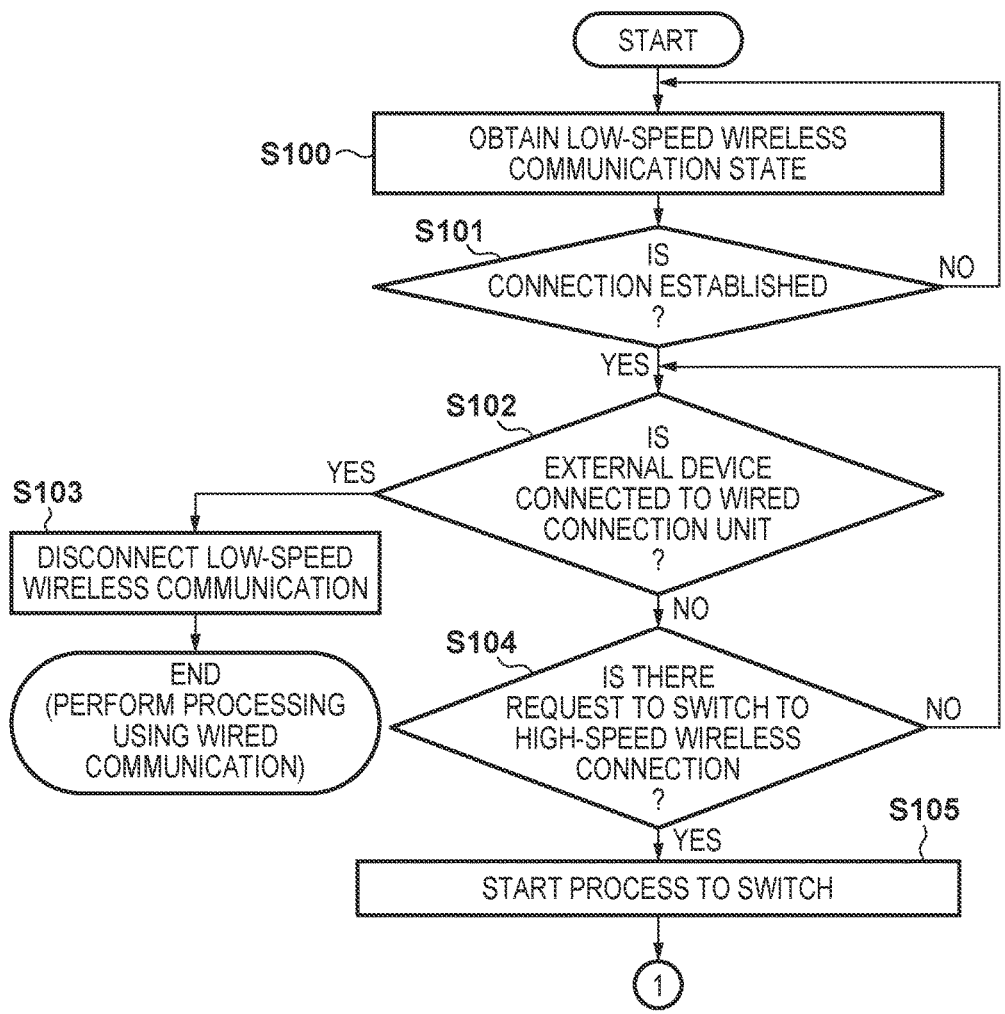

Next, explanation is given for a second embodiment of the present invention, with reference to FIGS. 2B-1 and 2B-2. For the present embodiment, explanation is given regarding communication permission/prohibition control because there is no change to the configuration of the digital camera while the communication permission/prohibition control differs to that of the first embodiment. In the first embodiment, if an external device is connected to a wired communication unit (the third communication unit 209) during a process for switching from low-speed wireless communication to high-speed wireless communication, wired communication by the third communication unit 209 is prohibited unconditionally. In contrast to this, the present embodiment differs in that wired communication is allowed in a case where a state of the digital camera satisfies a condition.

In FIGS. 2B-1 and 2B-2, reference numerals shared with FIG. 2A are used in regards to operations that are the same as those of the first embodiment, and duplicate explanations are omitted. In addition, in the present embodiment it is also assumed that communication performed by the first communication unit 207 through to the third communication unit 209 is the same as that in the first embodiment.

In the present embodiment, processing after it is detected in step S107 that an external device has been physically connected to the third communication unit 209 during a process for switching to high-speed wireless communication differs to that in the first embodiment. In other words, if it is determined in step S107 that an external device has physically connected to the third communication unit 209 (a wired communication unit), the control unit 203 advances the processing to step S117.

Step S117 through step S119 is processing for determining whether another user—in other words the user of the external device that is wirelessly connected—is using the digital camera, when the external device is physically connected to the third communication unit 209. Here, it is assumed that a determination is performed based on a position of a power supply switch and the reason (a factor) why the digital camera entered a power on state most recently, but another method may be used.

In step S117, the control unit 203 detects the reason why the digital camera entered the power on state most recently. The reason may be (1) an operation with respect to the operation unit 212 or (2) reception of an instruction from the external device that is connected by wireless communication, for example, but there is no limitation to these. In addition, (1) and (2) are respectively (a) a case of not resuming from an auto power off (or power saving mode) state, and (b) a case of resuming from an auto power off (or power saving mode) state. An auto power off state is a state in which, in a case where a power supply is turned on by a power supply switch operation, when operation of the operation unit 212 is not detected for a fixed period, the power supply is in part turned off to prevent battery consumption, and this may also be referred to as a sleep state or a power saving mode. In a duration from when there is a transition to the auto power off state until a resumption from the auto power off state, the power supply switch remains in an on position.

Consequently, there are the following four reasons for a digital camera to enter the power on state.

(1-a) An operation to change a power supply switch included in the operation unit 212 from an off position to an on position ("power supply switch").

(1-b) Activation based on an instruction from an external device that is connected by wireless communication ("external device").

(2-a) Resumption due to a specific operation (for example, an operation of half pressing a shutter button) of the operation unit 212 being detected in an auto power off (or power saving mode) state ("resumption (operation unit)").

(2-b) Resumption due to receiving an instruction from an external device through wireless communication in an auto power off (or power saving mode) state ("resumption (external device)").

(1-b) and (2-b) are cases in which a power supply to the first communication unit 207 continues even in an auto power off state or a state where the power supply switch is in an off position, for example. In these cases, when an instruction (request) from an external device for which a connection for wireless communication (normal or low-speed wireless communication) has been established is received, the control unit 203 puts the digital camera in the power on state.

Each time the digital camera enters the power on state, the control unit 203 stores information that represents the reason therefor in the non-volatile memory 205, for example. In step S117, the control unit 203 refers to the non-volatile memory 205 and obtains the most recent reason for the power on state.

In step S118, the control unit 203 detects whether the state of the power supply switch of the operation unit 212 is in an on position or an off position.

In step S119, the control unit 203 determines whether the conditions that the most recent reason for the power on state that is obtained in step S117 is communication from an external device ("external device" or "resumption (external device)") and that the state of the power supply switch detected in step S118 is the "off position" are satisfied. If the control unit 203 determines that the conditions for the most recent reason for the power on state and the state of the power supply switch have been satisfied, the processing proceeds to step S108, and if this is not determined the processing advances to step S120.

In step S108, similarly to in the first embodiment, wired communication by the third communication unit 209 is prohibited, and the processing returns to step S106.

Meanwhile, in step S120, the control unit 203 stops the process for switching from low-speed wireless communication to high-speed wireless communication that was started in step S105, and the processing advances to step S121.

In step S121, the control unit 203 allows wired communication by the third communication unit 209, and starts a process for establishing communication (a logical connection) with the external device that has a wired connection to the third communication unit 209.

A case in which the most recent reason for the power on state is communication from an external device and the power supply switch is in the "off position" corresponds to the case of (1-b) described above. In such a case, when an external device is connected by wire to the third communication unit 209, it is considered that a user is operating the external device that was wirelessly connected. In other words, it is considered that a user who connected the external device by wire to the third communication unit 209 is different to the user who is using the digital camera from the external device that was wirelessly connected.

In such a case, when the wired connection is allowed (in other words, the low-speed wireless communication connection is disconnected), the process for switching to high-speed wireless communication is interrupted, and the user who was originally using the digital camera suddenly ceases to be able to use the digital camera. Therefore, configuration is taken to not allow (prohibit) the wired connection.

Meanwhile, if the reason for the power on state is resumption from the auto power off state or is not communication from an external device, it is considered that a user who connected the external device to the third communication unit 209 has operated the external device or the operation unit 212. In these cases, because there is the possibility that it will cease to be possible to apply a suitable function for the user if wired communication is not allowed, the process for switching to wireless communication is stopped, and wired communication is allowed.

Note that, configuration may be taken to, in step S119, if the reason for the power on state is communication from an external device, determine that a user of an external device that wirelessly connected is in the process of using the digital camera, and prohibit a wired connection irrespective of the position of the power supply switch.

By virtue of the present embodiment, in addition to the effects of the first embodiment, it is possible to provide a suitable function to a user by performing communication permission/prohibition control that assumes that a user who is remotely using a digital camera is different to a user who has directly operated the digital camera.

(Third Embodiment)

Next, explanation is given for a third embodiment of the present invention, with reference to FIG. 2C. For the present embodiment, explanation is given regarding communication permission/prohibition control because there is no change to the configuration of the digital camera while the communication permission/prohibition control differs to that of the first embodiment. The present embodiment relates to control in a case where an external device is connected to a wired communication unit (the third communication unit 209) when a low-speed wireless communication connection has been established with an external device. In the present embodiment, the second communication unit 208 is not necessary.

In FIG. 2C, reference numerals shared with FIG. 2A or FIGS. 2B-1 and 2B-2 are used in regards to operations that are the same as those of the first or second embodiments, and duplicate explanations are omitted. In addition, in the present embodiment it is also assumed that communication performed by the first communication unit 207 and the third communication unit 209 is the same as that in the first embodiment.

Step S100 through step S101 are the same as in the first embodiment. When it is determined in step S101 that the first communication unit 207 has established a low-speed wireless communication connection with an external device (is in a connected state), in step S125, the control unit 203 starts processing with the external device that uses low-speed wireless communication.

In step S126, the control unit 203 determines whether the low-speed wireless communication connection has been disconnected, and if it is determined to have been disconnected the processing returns to step S100, and if is it not determined to have been disconnected the processing advances to step S102.

In step S102, the control unit 203 determines whether a connection by an external device with respect to the third communication unit 209 (a physical connection) has been detected, and if it is determined that a connection has been detected the processing advances to step S129, and if it is not determined that a connection has been detected the processing returns to step S126.

In step S129, the control unit 203 detects an operation mode of the digital camera by referring to the non-volatile memory 205, for example. Here, it is assumed that operation modes of the digital camera in a case where a low-speed wireless communication connection with an external device has been established are "image capturing mode", "playback mode", and "special mode", but there is no limitation to these.

The "image capturing mode" is an operation mode for providing an external device with a function relating to digital camera remote capturing, such as transmitting an instruction for an image capturing operation or a shooting preparation operation to the digital camera remotely from the external device with which the low-speed wireless communication connection has been established.

The "playback mode" is an operation mode for providing a function for browsing or obtaining image data recorded on the recording medium 210 (or the volatile memory 204) by the external device with which the low-speed wireless communication connection has been established.

The "special mode" is an operation mode for providing the external device with a special function, such as a function for updating the firmware of the external device with which the low-speed wireless communication connection has been established from the digital camera. Note that functions explained in relation to the operation modes here are merely examples, and there is no limitation to them.

In step S130, the control unit 203 detects a type of the external device with which the low-speed wireless communication connection has been established. The control unit 203 can detect the type of the external device based on device information that is stored in the volatile memory 204 and is obtained from the external device when the low-speed wireless communication connection is established, but another method may be used. The device information may be "smart phone", "GPS receiver", "remote controller", or the like, for example, but there is not limitation to these.

In step S131, the control unit 203 determines whether the operation mode of the digital camera and the type of the external device satisfy predetermined conditions, and if it is determined the predetermined conditions have been satisfied the processing advances to step S108, and if it is not determined that the predetermined conditions have not been satisfied the processing advances to step S103. Here, it is assumed that the predetermined conditions are that the operation mode detected in step S129 is the "special mode" and that the type of the external device identified in step S130 is "remote controller". These are examples of conditions in which it is possible processing for which interruption is undesirable is being performed, such as a firmware update of an external device.

In step S108, similarly to in the first embodiment, the control unit 203 prohibits communication by the third communication unit 209, and the processing returns to step S126. By this, wired communication with an external device that has connected to the third communication unit 209 is prohibited until the low-speed wireless communication connection with an external device is disconnected.

In step S103, the control unit 203 disconnects the low-speed wireless communication connection by the first communication unit 207, and allows wired communication by the third communication unit 209.

In step S121, the control unit 203 allows wired communication by the third communication unit 209, and starts a process for establishing communication (a logical connection) with the external device that has a wired connection to the third communication unit 209.

Note that, in the present embodiment, explanation is given regarding a case of prohibiting wired communication when the operation mode of the digital camera is the "special mode" and the type of the external device is "remote controller". However, the essence of the present embodiment is control of permission/prohibition of wired communication in accordance with whether a predetermined condition related to at least one of the operation mode of a digital camera and the type of an external device is satisfied, and limitation to a combination of a specific operation mode and a specific type is not intended. For example, configuration may be taken to not allow wired communication irrespective of the type of an external device if the operation mode of the digital camera is the "special mode", and not allow wired communication irrespective of the operation mode if the external device is a specific type. Regarding the conditions determined in step S131, they can be stored in the non-volatile memory 205 in advance.

By virtue of the present embodiment, when, while wireless communication with an external device is established, another external device connects to a wired communication unit, permission/prohibition of wired communication is decided in consideration for an operation mode of the communication device or a type of the external device with which wireless communication is established. Therefore, it is possible to appropriately determine permission/prohibition of the wired communication in accordance with a type of the external device with which wireless communication is established, in accordance with processing that is being performed using the wireless communication between the communication device and the external device, or the like, and it is possible to realize communication permission/prohibition control that considers usability for a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-158127, filed on Aug. 10, 2016, which is hereby incorporated by reference herein in its entirety.

What is claimed is:

1. A communication device, comprising:
   a first communication interface;
   a second communication interface;
   a third communication interface; and
   at least one processor to perform operations of:
   a switching unit configured to switch communication by the first communication interface to communication by the second communication interface; and
   a control unit,
   wherein the control unit
   in a first period that does not include a period of a process for switching by the switching unit, gives priority to communication by the third communication interface even if communication by the first communication interface is underway, and
   in a second period that includes the period of the process for switching by the switching unit, gives priority to communication by the first communication interface over communication by the third communication interface.

2. The communication device according to claim 1, wherein upon detecting a connection by the third communication interface with an external apparatus in the first period, the control unit performs control to terminate communication by the second communication interface and establish communication by the third communication interface.

3. The communication device according to claim 1, wherein upon detecting a connection by the third communication interface with an external apparatus in the second period, the control unit performs control so as to not establish communication by the third communication interface.

4. The communication device according to claim 1, wherein communication by the first communication interface is slower and has lower power consumption in comparison to communication by the second communication interface.

5. The communication device according to claim 1, wherein communication by the first communication interface and communication by the second communication interface are wireless communication, and communication by the third communication interface is wired communication.

6. The communication device according to claim 1, wherein
   the control unit,
   if it is detected that a second external device is connected to the third communication interface during a process for switching, by the switching unit, communication with a first external device from communication by the first communication interface to communication by the second communication interface,
   prohibits communication by the third communication interface of the communication device upon determining that a user of the first external device is using the communication device, and
   allows communication by the third communication interface of the communication device upon not determining that a user of the first external device is using the communication device.

7. The communication device according to claim 6, wherein the control unit performs the determination based on, out of a reason why the communication device most recently entered a power on state and a state of a power supply switch of the communication device, at least the reason.

8. The communication device according to claim 7, wherein the control unit determines that a user of the first external device is using the communication device if the reason why the communication device most recently entered the power on state is reception of an instruction from the first external device.

9. The communication device according to claim 7, wherein the control unit determines that a user of the first external device is using the communication device if the reason why the communication device most recently entered the power on state is reception of an instruction from the first external device and the power supply switch is in an off state.

10. A communication device according to claim 1, wherein the communication device is a capturing device.

11. A method of controlling a communication device having a first communication interface,
   a second communication interface,
   a third communication interface, and
   a switching unit that switches communication by the first communication interface to communication by the second communication interface, the method comprising:
   in a first period that does not include a period of a process for switching by the switching unit, giving priority to communication by the third communication interface even if communication by the first communication interface is underway, and
   in a second period that includes the period of the process for switching by the switching unit, giving priority to communication by the first communication interface over communication by the third communication interface.

12. A non-transitory computer-readable storage medium storing a program having instructions that can be executed by one or more processors provided in a communication device having
   a first communication interface,
   a second communication interface,
   a third communication interface, and
   a switching unit for switching communication by the first communication interface to communication by the second communication interface,
   the instructions, when executed by the one or more processors, cause the one or more processors to function as a control unit configured to,
   in a first period that does not include a period of a process for switching by the switching unit, give priority to communication by the third communication interface even if communication by the first communication interface is underway, and
   in a second period that includes the period of the process for switching by the switching unit, give priority to communication by the first communication interface over communication by the third communication interface.

* * * * *